US006682431B2

United States Patent
Uehara (12) United States Patent
(10) Patent No.: US 6,682,431 B2
(45) Date of Patent: Jan. 27, 2004

(54) DAMPER MECHANISM (75) Inventor: Hiroshi Uehara, Hirakata (JP)

(73) Assignee: Exedy Corporation, Neyagawa (JP)

( * ) Notice: Subject to any disclaimer, the term of this patent is extended or adjusted under 35 U.S.C. 154(b) by 36 days.

(21) Appl. No.: 09/953,976

(22) Filed: Sep. 18, 2001

(65) Prior Publication Data
US 2002/0039926 A1 Apr. 4, 2002

(30) Foreign Application Priority Data

Sep. 29, 2000 (JP) ........................................ 2000-300335

(51) Int. Cl.$^7$ ................................................ F16D 3/12
(52) U.S. Cl. ........................ 464/68; 192/203; 192/205
(58) Field of Search ............................. 464/64, 66, 68; 267/171, 180; 192/203, 205

(56) References Cited

U.S. PATENT DOCUMENTS

| | | | | |
|---|---|---|---|---|
| 1,089,168 A | * | 3/1914 | Webster | 464/66 X |
| 3,336,842 A | * | 8/1967 | Adelt | 267/180 X |
| 4,810,231 A | * | 3/1989 | Weissenberger et al. | 267/180 X |
| 4,850,932 A | * | 7/1989 | Kagiyama et al. | 464/68 |
| 5,052,664 A | * | 10/1991 | Lesher et al. | 267/180 X |
| 5,259,599 A | * | 11/1993 | Hernandez | 267/180 |
| 6,145,762 A | * | 11/2000 | Orloff et al. | 267/180 X |
| 6,461,243 B1 | * | 10/2002 | Uehara | 464/68 |

FOREIGN PATENT DOCUMENTS

GB 2 123 925 A * 2/1984 .................. 464/66

OTHER PUBLICATIONS

SAE Spring Design Manual, AE–11, Warrendale, PA, Society of Automotive Engineers, Inc., p. 2.32, Sep. 1993, TJ210.S67.*

* cited by examiner

Primary Examiner—Greg Binda
(74) Attorney, Agent, or Firm—Shinjyu Global IP Counselors, LLP (57) ABSTRACT A damper mechanism is provided to achieve intended torsion characteristics in a damper mechanism using coil springs of an irregular pitch type. Coil spring assemblies 4 are employed for elastically coupling plates and a hub flange in a rotating direction. The coil spring assembly 4 includes a coil spring 28 of an irregular pitch type and a pair of spring seats 29 and 30. The spring seats 29 and 30 are engaged with the ends of the coil spring 28 while being prevented from relatively rotating around an axis of the coil spring 28, respectively. The spring seats 29 and 30 are engaged with the plates and the hub flange while being prevented from relatively rotating around the axis of the coil spring 28.

20 Claims, 6 Drawing Sheets

DAMPER MECHANISM

BACKGROUND OF THE INVENTION

1. Field of the Invention

The invention relates to a damper mechanism, and particularly a damper mechanism having coil springs having an irregular pitch.

2. Background Information

A damper mechanism used in a clutch disk assembly of a vehicle is formed of an input rotary member, an output rotary member, and an elastic coupling. The input rotary member can be coupled to an input flywheel. The output rotary member is preferably coupled to a shaft of a transmission. The elastic coupling mechanism elastically couples the input and output rotary members in a rotating direction. The input rotary member is formed of a clutch disk and a pair of input plates fixed to the clutch disk. The output rotary member is formed of a hub, which is unrotatably coupled to the transmission shaft. The hub is formed of a cylindrical boss spline-engaged with the transmission shaft and a radial flange formed around the boss. The elastic coupling mechanism is formed of a plurality of coil springs. Each coil spring is arranged in a window aperture formed in the flange, and is supported in windows formed in the input plate pair. The damper function described above absorbs and damps torsional vibrations applied to the clutch disk assembly.

The coil spring may have an irregular-pitch structure, in which spaces between coil wire portions are not constant. In this structure, the number of active turns changes and the spring constant changes when a portion of coils abut against each other. Thus, the single coil spring can exhibit multiple stages in torsion characteristics. More specifically, a portion or portions of the coil spring abut against each other after a region of low rigidity is ensured so that a predetermined stop torque may be obtained by increasing the spring constant.

When the coil spring is compressed in the disk rotating direction, the radially outer portion is compressed to a larger extent than the radially inner portion. This is due to the fact that a radially outer portion, e.g., of an edge of a window, which pushes the coil spring, moves a longer distance in the rotating direction than its radially inner portion. Therefore, the coil spring having an irregular pitch must be configured to have a wire-space (i.e., a large space between neighboring wire portions) in the radially outer portion, which is larger than that in the radially inner portion, for simultaneously bringing the radially outer and inner portions into the intimate contact states (i.e., fully compressed states).

However, during the operation of the damper, the coil spring may rotate around its own axis within the window. If rotated, the positions of the end portions of the coil spring change so that the portion of a smaller wire-space may move to a radially outer side, moving the portion of a large wire-space to a radially inner side. If moved, the coil spring is compressed in a manner such that the radially outer portion is fully compressed excessively quickly, and full compression of the radially inner portion is delayed or does not occur. More generally, the rotation of the coil spring may change the change timing of the torsion characteristics (timing of the change in the spring constant due to spring compression) as well as the torsional rigidity so that the intended torsion characteristics cannot be obtained.

In view of the above, there exists a need for damper mechanism which overcomes the above mentioned problems in the prior art. This invention addresses this need in the prior art as well as other needs, which will become apparent to those skilled in the art from this disclosure.

SUMMARY OF THE INVENTION

An object of the present invention is to achieve intended torsion characteristics in the damper mechanism using coil springs with an irregular pitch.

According to a first aspect, a damper mechanism includes an input rotary member, an output rotary member, and a coil spring assembly. The coil spring assembly is employed for elastically coupling the input and output rotary members in a rotating direction. The coil spring assembly includes an irregular pitch coil spring and a pair of spring seats. Each spring seat is engaged with an end of the coil spring such that relative rotation of the coil spring around its own axis is prevented. The spring seat is engaged with the input and output rotary members while being prevented from rotation around the spring axis.

In this damper mechanism, the coil spring does not rotate around its own axis relatively to the input and output rotary members. Thus, the radially inner and outer portions of the coil spring do not change their positions with each other. Therefore, the timing of the change in the spring constant due to spring compression of each of the coil spring portions does not change, and the intended torsion characteristics can be obtained.

According to a second aspect, the damper mechanism of the first aspect further has a feature such that the radially outer portion of the coil spring has a first space between turns and a second space between turns larger than the first space. Further, the radially inner portion has a third space between turns smaller than the first space and a fourth space between turns larger than the third space. The "radially" outer and inner portions are the outer and inner portions determined based on a radial direction of the damper mechanism.

According to a third aspect, the damper mechanism of the second aspect further has a feature such that the first and third spaces simultaneously disappear when the coil spring is compressed in accordance with the relative rotation between the input and output rotary members.

According to a fourth aspect, the damper mechanism of the first, second, or third aspect further has a feature such that the number of active turns of the radially inner portion of the coil spring is larger than the number of active turns of the radially outer portion. Since the above state can be maintained, it is possible to prevent a large difference, which may occur in deformation amount per turn between the radially inner and outer portions of the compressed spring. Therefore, it is possible to reduce a difference in stress per turn between the radially inner and outer portions of the compressed spring.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
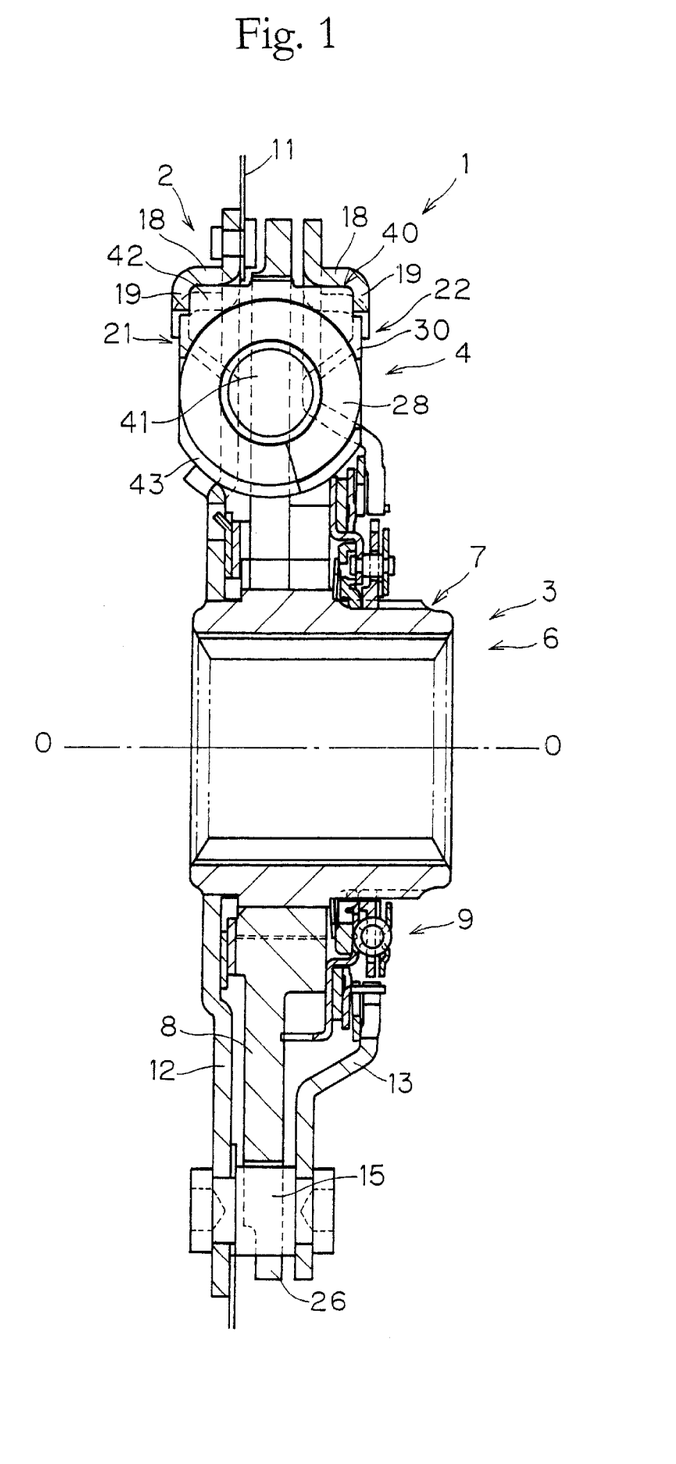
FIG. 1 is a schematic cross-sectional view of a clutch disk assembly in accordance with a preferred embodiment of the present invention.
Figure 2:
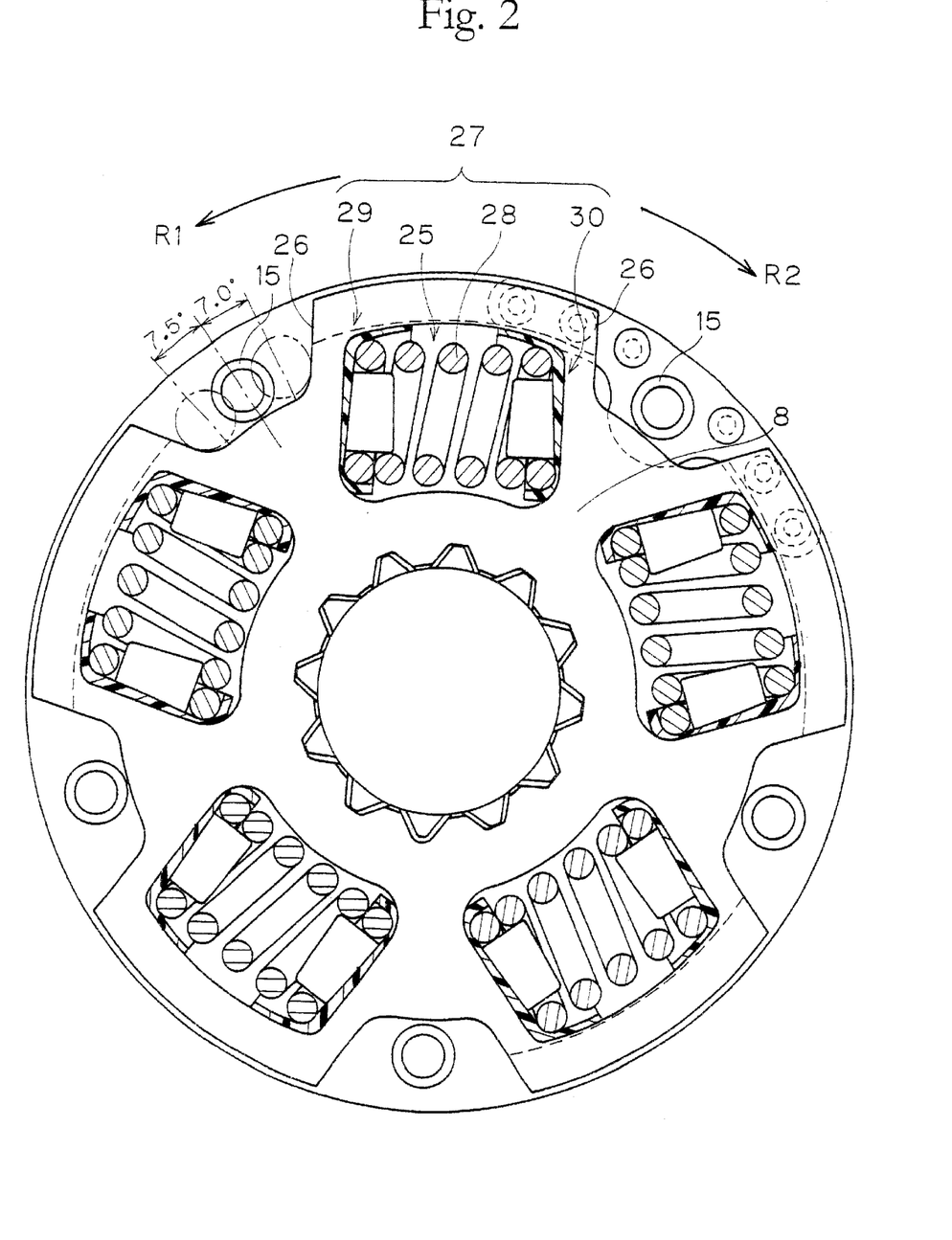
FIG. 2 is a schematic elevational view of the clutch disk assembly of FIG. 1 with a certain part cut away for illustrative purposes.

FIG. 1 is a cross-sectional view of a clutch disk assembly 1 in accordance with an embodiment of the present invention. FIG. 2 is a schematic elevational view of the same. A clutch disk assembly 1 is a power transmission device used in a clutch device of a vehicle, and has a clutch function and a damper function. The clutch function is a function for selectively transmitting and intercepting a torque by engagement with and disengagement from a flywheel (not shown). The damper function is a function for absorbing and damping torque and other variations, which are applied from the flywheel side, by springs and other parts.

In FIG. 1, 0—0 represents a rotation axis of the clutch disk assembly 1. On the left side in FIG. 1, an engine and a flywheel (both not shown) are arranged. On the right side in FIG. 1, a transmission (not shown) is arranged. In FIG. 2, an arrow R1 indicates the drive side (positive rotating direction) of the clutch disk assembly 1, and an arrow R2 indicates an opposite side (negative rotation side). In the following description, the "rotating (circumferential) direction," "axial direction," and "radial direction" represent the respective directions of the clutch disk assembly 1 considered as the damper mechanism, unless otherwise specified.

As seen in FIGS. 1 and 2, the clutch disk assembly 1 is primarily formed of an input rotary member 2, an output rotary member 3, and an elastic coupling portion 4 arranged between the input and output rotary members 2 and 3. The input rotary member 2 is configured to receive torque from the flywheel (not shown). The input rotary member 2 is primarily formed of a clutch disk 11 (only its radially inner portion is shown), a clutch plate 12, and a retaining plate 13. The clutch disk 11 is configured to be pressed against the flywheel (not shown) for engagement. The clutch disk 11 is formed of a cushioning plate as well as a pair of friction facings fixed to the axially opposite sides of the cushioning plate by rivets, all of which are not shown in FIG. 1. The clutch and retaining plates 12 and 13 are both formed of circular plate members prepared by press working, and are axially spaced from each other by a predetermined distance. The clutch plate 12 is arranged on the engine side, and the retaining plate 13 is arranged on the transmission side. The radially outer portions of the clutch and retaining plates 12 and 13 are fixed together by a plurality of stop pins 15 spaced in the rotating direction from each other. Thereby, the clutch and retaining plates 12 and 13 can rotate together, and are axially spaced from each other by a fixed distance. Each of the clutch and retaining plates 12 and 13 is provided with a central aperture in which a boss 7 is disposed, as will be described later.

Figure 5:
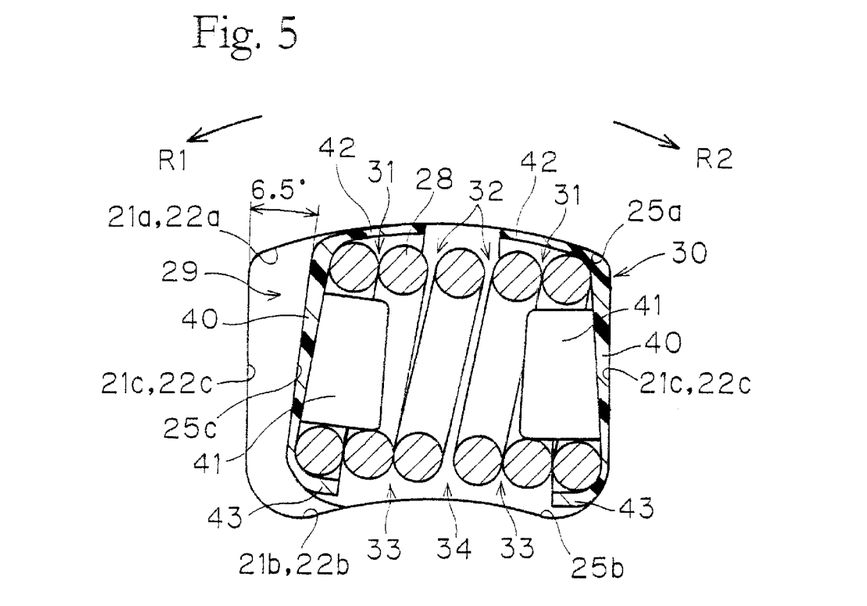
FIG. 5 is a cross-sectional elevational view showing an operation of an elastic coupling portion of FIG. 2
Figure 6:
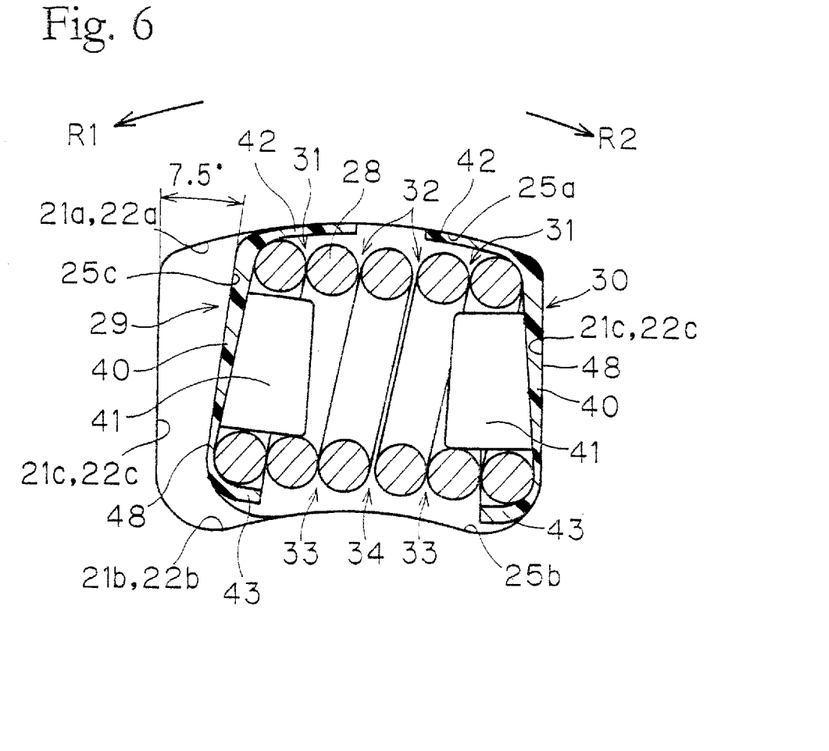
FIG. 6 is a cross-sectional elevational view showing an operation of an elastic coupling portion of FIG. 2.

Each of the clutch and retaining plates 12 and 13 is provided with a plurality of windows 21 and 22 arranged in the circumferential direction. These windows 21 and 22 in each of the plates 12 and 13 are preferably five in number, and are circumferentially equally spaced from each other. Each of the windows 21 and 22 is substantially circumferential long. Each of the first and second windows 21 and 22 is formed of a hole opened axially and a spring support portion formed along the edge of the hole. Referring now to FIGS. 5 and 6, the spring support portion is formed of a radially outer support portion 21a or 22a, a radially inner support portion 21b or 22b, and circumferential end support portions 21c or 22c. Each of the radially outer support portions 21a and 22a is curved substantially circumferentially, and each of the radially inner support portions 21b and 22b has a substantially curved form. Each of the circumferential end support portions 21c and 22c extends substantially linearly in the radial direction. As seen in FIG. 1, each of the support portions 21a and 22a–21c and 22c is formed of a first portion 18 extending axially from a body portion of the plate 12 or 13, and a second portion 19 extending substantially toward an inner side of the window 21 or 22 from the first portion 18.

Referring to FIGS. 1 and 2, description will now be given on the output rotary member 3. The output rotary member 3 is formed of a hub 6. The hub 6 is formed of a boss 7, a hub flange 8, and a low-rigidity damper 9. The boss 7 has a cylindrical form, and is disposed within the central apertures of the clutch and retaining plates 12 and 13. The boss 7 is spline-engaged with a transmission input shaft (not shown) fitted into the central aperture. The hub flange 8 is formed radially around the boss 7, and has a circular plate-like form. The flange 8 is arranged axially between the clutch and retaining plates 12 and 13. The hub flange 8 has the radially inner portion coupled to the boss 7 via the low-rigidity damper 9. When the hub flange 8 rotates relatively to the boss 7, small coil springs arranged in the low-rigidity damper 9 are compressed in the rotating direction.

Figure 4:
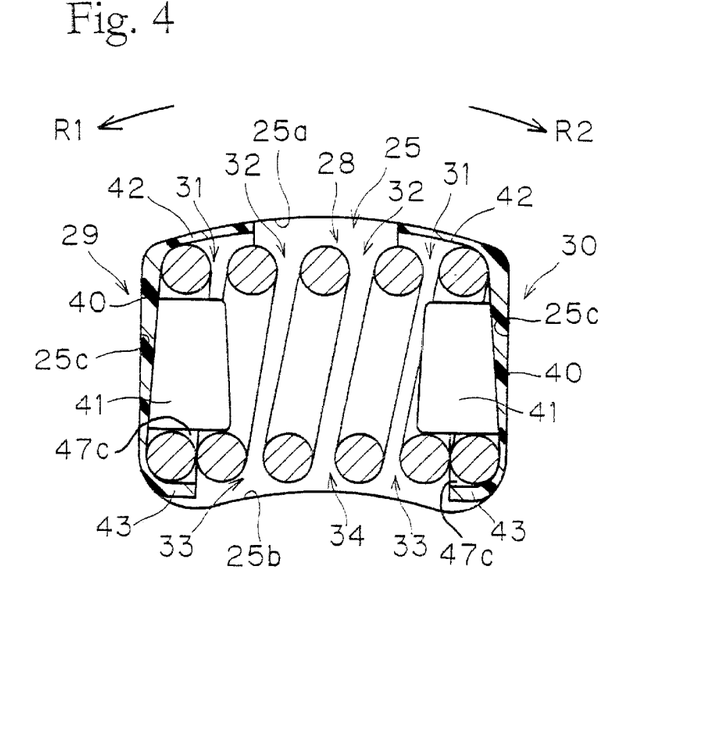
FIG. 4 is a cross-sectional elevational view showing an operation of an elastic coupling portion of FIG. 2.

The hub flange 8 is provided with windows 25 corresponding to the windows 21 and 22. The windows 25 are preferably five in number, and are circumferentially equally spaced from each other. Each of the windows 25 is formed of a hole opened axially and has a configuration substantially corresponding to those of the windows 21 and 22. Each of the windows 25 is substantially circumferential long. As seen in FIG. 4, each of the windows 25 has a radially outer support portion 25a, a radially inner support portion 25b, and circumferential end support portions 25c. The radially outer support portion 25a is curved substantially circumferentially. The radially inner support portion 25b has a substantially curved form. The circumferential end support portions 25c extend substantially linearly in the radial direction.

Referring again to FIGS. 1 and 2, the elastic coupling portion 4 is formed of a plurality of coil spring assemblies 27. Each coil spring assembly 27 is arranged within the window aperture 25 and the windows 21 and 22. Each coil spring assembly 27 is formed of a coil spring 28 and a pair of spring seats 29 and 30 arranged on the opposite ends of the coil spring 28. The coil spring 28 has a circular section. Each end of the coil spring 28 is closed, and forms an end turn. However, the surface of each end turn is not subjected to polishing, and maintains the sectional form of the coil wire. The "end turn" in this embodiment is the same as one turn of each end of the coil spring 28.

Figure 3:
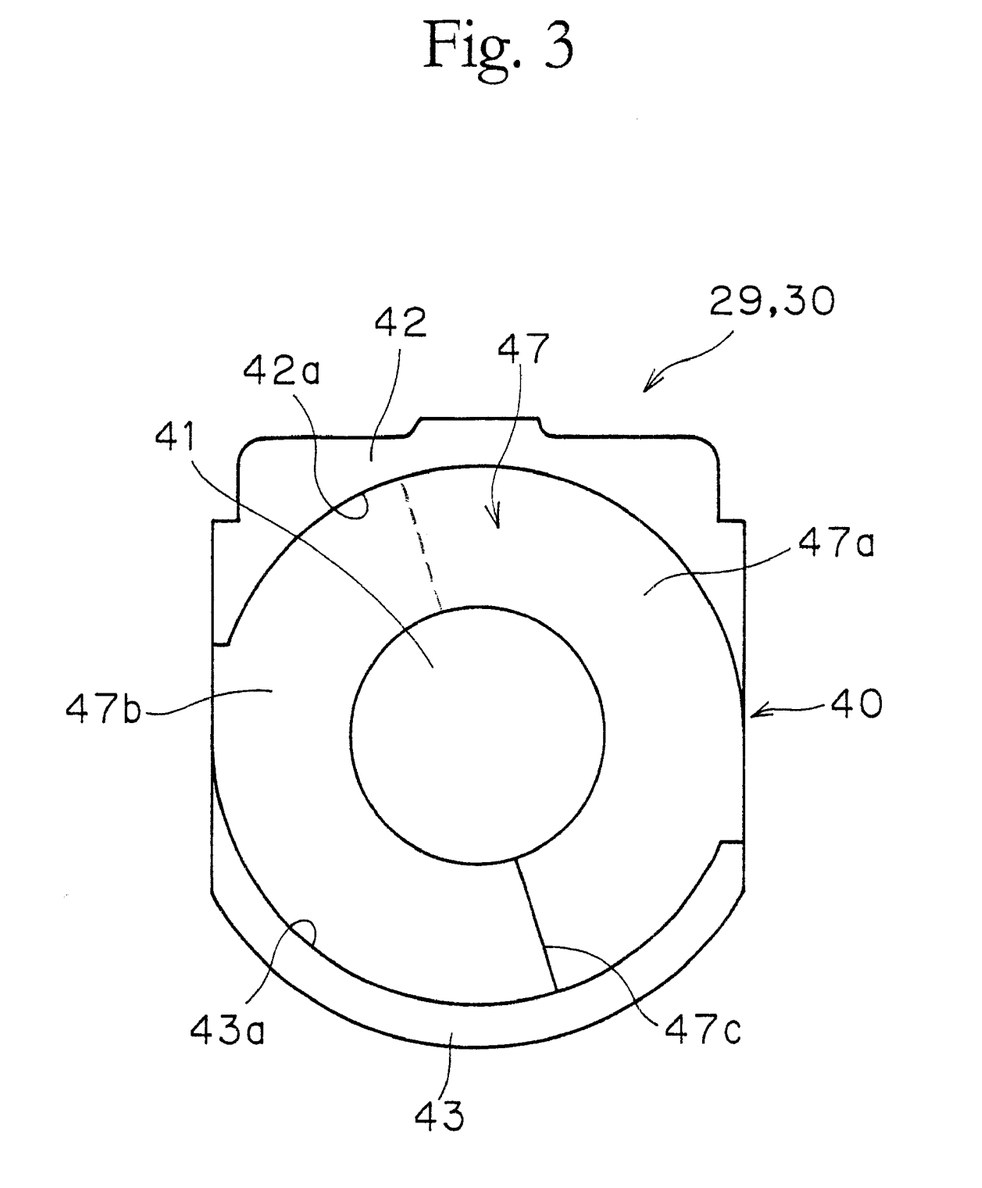
FIG. 3 is an elevational view-of a seat member shown in FIG. 2.

The spring seats 29 and 30 are made of hard resin or elastic resin material. For example, the elastic resin material may be thermoplastic polyester elastomer. As seen in FIGS. 3 and 6, each of the spring seats 29 and 30 is provided with a seat portion 40 having a seat surface 47 for receiving an end turn surface of the coil spring 28. On the opposite side, the seat portion 40 has a rear surface 48 to be supported in the window aperture 25 and the windows 21 and 22. As can be seen from FIG. 3, the seat surface 47 has an annular form. The seat surface 47 has a first half circle 47a having a substantially flat form relative to a plane that is perpendicular to a center axis of the spring seats 29 and 30. The seat surface 47 also has a second half circle 47b having a height relative to the plane, which gradually increases as the position moves counterclockwise in a plan view from one end toward the other. One end of the second half circle 47b is continuous to the first half circle 47a, and the other end thereof provides a stepped portion with respect to the first half circle 47a. In the stepped portion, the seat surface 47 forms a contact surface 47c substantially perpendicular to the circumferential direction (i.e., surface 47c facing counterclockwise in the elevational view). In other words, the contact surface 47c extends from the first half circle 47a in a direction parallel to a center axis of the spring seat 29 and 30. The seat surface 47 has a configuration corresponding to that of the end turn of the coil spring 28, and the contact surface 47c is in contact with the leading end surface of the end turn.

Since the end turn of the coil spring 28 is not subjected to the polishing, the manufacturing cost can be low. The spring seats 29 and 30 are inexpensive, and therefore the structure described above is more advantageous than a structure in which spring seats are not employed and end surfaces of the coil spring are polished. Since the coil spring 28 is not polished, breakage and other problems can be suppressed. Further, the end of the coil spring 28 has the substantially same area as the other portions because it is not polished. Therefore, the end can reliably contact the contact surface 47c.

Since the spring seats 29 and 30 have the same configurations, the contact surfaces 47c of the spring seats 29 and 30, which are opposed to each other, are directed oppositely from each other (i.e., opposed to each other) in the circumferential direction of the seat surface 47. Each end surface of the coil spring 28 is in contact with the contact surface 47c. Thereby, the coil spring 28 cannot rotate around its own axis with respect to the paired spring seats 29 and 30. Since the contact surfaces 47c of the paired spring seats 29 and 30 are directed oppositely to each other in the directions of turn of the coil spring 28, the coil spring 28 can rotate in neither of the directions around its axis.

As seen in FIGS. 3 and 4, the seat portion 40 is provided at its surface opposed to the seat surface 47 with a projection 41 extending circumferentially toward the inner side of the window aperture 25. The projection 41 has a columnar form. On the same side as the projection 41, the seat portion 40 is provided at its radially outer portion with a radially outer support portion 42. The radially outer support portion 42 is provided on its radially inner side with a support surface 42a having an arc-shaped section extending along the seat surface 47. The support surface 42a supports the radially outer portion of the end turn of the coil spring 28, and further supports the axially opposite portions thereof. The radially outer support portion 42 extends circumferentially along the radially outer support portion 25c and others of the window aperture 25 and others. The seat portion 40 is provided at its inner side with a radially inner support portion 43. The radially inner support portion 43 has a support surface 43a having an arc-shaped section extending along the seat surface 47. The radially inner support portion 43 supports the radially inner portion and axially opposite portions of the coil spring 28.

As seen in FIG. 1, the first and second portions 18 and 19 of the radially outer support portions 21a and 22a of the windows 21 and 22 are in contact with the radially outer portions of the spring seats 29 and 30, respectively. In this state, the spring seats 29 and 30 can move in the rotating direction (i.e., circumferentially oppositely) away from the circumferential end support portions 21c and 22c of the windows 21 and 22, but cannot move in the axial and radial directions when they are in the engaged state. Furthermore, the spring seats 29 and 30 cannot rotate around the axis of the coil spring 28 with respect to the windows 21 and 22.

As seen in FIG. 6, the spring seats 29 and 30 are supported by the circumferential end support portions 25c of the window aperture 25. More specifically, the rear surface 48 is in contact with the circumferential end support portion 25c of the window aperture 25. The radially outer support portions 42 of the spring seats 29 and 30 are in contact with the radially outer support portion 25a of the window aperture 25. In this state, the spring seats 29 and 30 can move in the rotating direction (circumferentially oppositely) away from the circumferential end support portions 25c of the window aperture 25, respectively, but are radially unmovable. The spring seats 29 and 30 cannot rotate around the axis of the coil spring 28 with respect to the hub flange 8. This is because the radially outer support portions 42 of the spring seats 29 and 30 as well as the radially outer support portion 25a of the window aperture 25 are curved, and prevent the rotation of the spring seats 29 and 30.

The number of active turns of the coil spring 28 is preferably four on the radially inner side, and is preferably three on the radially outer side. Thus, the number of active turns of the radially inner portion of the coil spring 28 is preferably larger by one than that of the radially outer portion. The coil spring 28 is an irregular pitch type. More specifically, as shown in FIG. 4, the radially outer portion of the coil spring has four wire spaces (i.e., four spaces between coil wire portions) in the radially outer portion. These four spaces are formed of first spaces 31 on the opposite ends and two second spaces 32 in the middle portion. Each second space 32 is larger than each first space 31. The first space 31 is configured to disappear prior to the second spaces 32, as seen in FIG. 5. Referring again to FIG. 4, the radially inner portion of the coil spring has three wire spaces, which are formed of third spaces 33 on the opposite sides and a fourth space 34 in the middle position. Each third space 33 is smaller than the fourth space 34, and is configured to disappear prior to the fourth space 34, as shown in FIG. 5. Referring again to FIG. 4, the first space 31 is larger than the third space 33, and the sizes thereof are determined such that the spaces 31 and 33 simultaneously disappear when the torsion angle of the damper increases.

As seen in FIG. 2, the pin 15 extends through a recess 26 formed in the hub flange 8. The recess 26 has a predetermined circumferential length so that the pin 15 can circumferentially move within a predetermined angular range. In this embodiment, the pin 15 can move an angular distance of 7.0 degrees in the rotating direction R2 from the neutral position shown in FIG. 2, and can move an angular distance of 7.5 degrees in the rotating direction R1.

Description will now be given on the torsion characteristics of the elastic coupling portion 4. In the following description, the low-rigidity damper 9 will not be described, and the characteristics will be described as the torsional operation between the plates 12 and 13 and the hub flange 8.

In the initial assembly state shown in FIG. 4, the hub flange 8 is twisted in the direction of the arrow R2 with respect to the plates 12 and 13. Thereby, the coil spring 28 is compressed in the rotating direction between the circumferential end support portion 25c on the R1 side (i.e., forward side in the rotating direction R1) of the window aperture 25 and the circumferential end support portions 21c and 22c on the R2 side of the windows 21 and 22.

Figure 8:
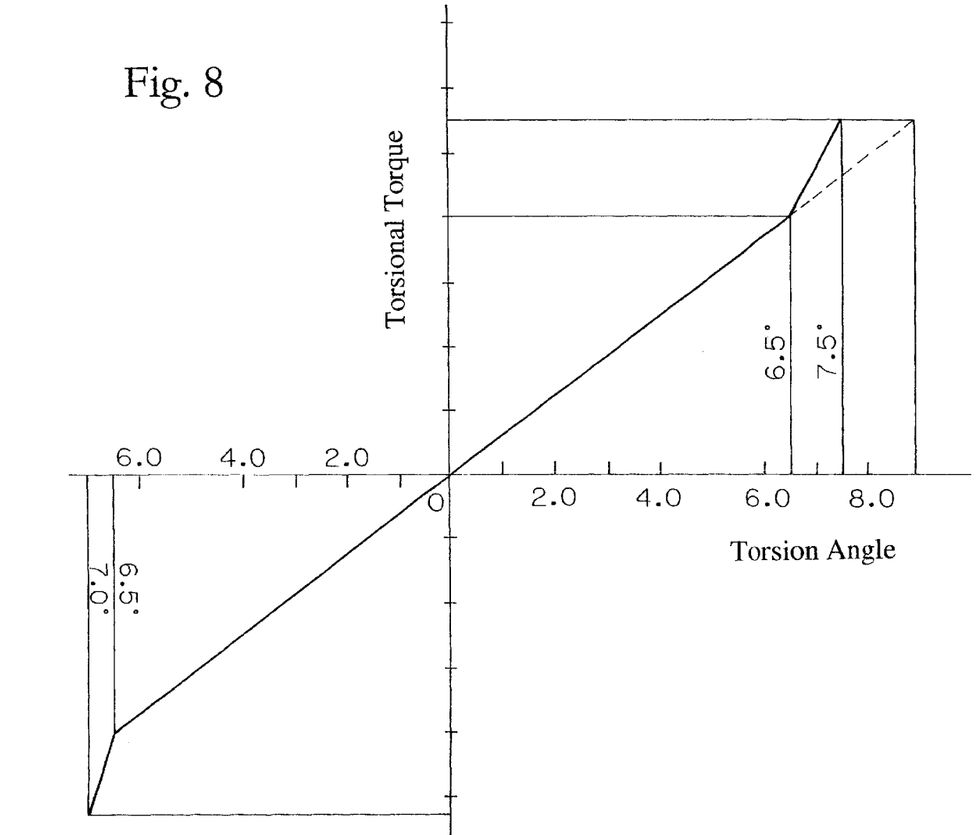
FIG. 8 is a view of a graph showing torsion characteristics of the damper mechanism.

When the torsion angle is small, all the coils are partially compressed, and the number of active turns do not change so that a relatively low rigidity is exhibited (0°–6.5°in FIG. 8). When the torsion angle increases to 6.5 degrees, the radially outer portion of the coil spring 28 forming the first space 31 as well as the radially inner portion forming the third space 33 disappear, as shown in FIG. 5. In other words, the coil portions, which were spaced from each other by the first space 31, come into contact with each other, and the coil portions, which were spaced from each other by the third space 33, come into contact with each other. In this state, the second and fourth spaces 32 and 34 remain. As a result of the above intimate contact, the numbers of active turns in the radially inner portion and the radially outer portion change into one and two, respectively.

When the coil spring 28 is further compressed, it exhibits a high spring constant because the number of active turns is reduced as a whole. As a result, a relatively high torsional rigidity is obtained so that a sufficiently high stop torque is achieved (6.5°–7.5° in FIG. 8). When the torsion angle reaches 7.5°, the end surface on the R1 side of the recess 26 comes into contact with the pin 15 to stop the torsional operation of the elastic coupling portion 4 as seen in FIG. 2. Additionally, the maximum torsion state of the elastic coupling portion 4 is shown in FIG. 6. In FIG. 6, the second space 32 has substantially disappeared, but the fourth space 34 remains.

The structure for preventing the rotation of the coil spring is as follows.

The spring seats are engaged with the plates and the hub flange as follows. As shown in FIGS. 1 and 4, the spring seats 29 and 30 are engaged in the windows 21 and 22, and are prevented from relative rotation thereto around the axis of the coil spring 28. More specifically, the first and second portions 18 and 19 of the radially outer portions 21a and 22a of the spring seats 29 and 30 are in contact with the radially outer portions of the spring seats 29 and 30 so that the spring seats 29 and 30 engaged in the windows 21 and 22 are unrotatable around the axis of the coil spring 28.

The spring seats 29 and 30 are also engaged with the hub flange 8, and are prevented from relative rotation thereto around the axis of the coil spring 28. More specifically, the spring seats 29 and 30 have radially outer support portions 42, which are curved along the radially outer support portion 25a of the window aperture 25, so that the spring seats 29 and 30 engaged in the window 25 are unrotatable around the axis of the coil spring 28.

The coil spring is engaged with the spring seats as follows. Referring to FIGS. 3 and 4, the coil spring 28 is supported by the spring seats 29 and 30 such that it is unrotatable around the axis of the coil spring 28. More specifically, since the spring seats 29 and 30 have the same configurations, the contact surfaces 47c of the spring seats 29 and 30, which are opposed to each other, are directed oppositely to each other in the circumferential direction of the seat surface 47. Since the end surface of the coil spring 28 is in contact with the contact surface 47c, the coil spring 28 cannot rotate in either direction around its own axis with respect to the spring seat pair 29 and 30.

As seen in FIG. 1, owning to the above structure, the coil spring 28 engaged with the spring seats 29 and 30 is unrotatable around its axis with respect to the plates 12 and 13 as well as the hub flange 8. In other words, the coil spring 28 can maintain the initial assembly state even during the operation of the damper.

The coil spring prevented from rotation can bring about the following advantages.

The number of active turns can be maintained. As shown in FIGS. 4–6, when the coil spring 28 is compressed, the amount of compression in the radially outer portion of the coil spring 28 is larger than that in the radially inner portion. However, the number of active turns in the radially inner portion is larger than that in the radially outer portion. Therefore, a difference in deformation amount per turn between the radially inner and outer portions can be smaller than that in the prior art. More specifically, the deformation amount per turn in the radially outer portion is larger than that in the radially inner portion, but the difference between them is smaller than that in the prior art. As a result, it is possible to suppress a difference in stress between the radially inner and outer portions of the coil spring 28. In other words, a difference in stress per turn between the radially inner and outer portions can be small. As a result, the coil spring 28 can have a long lifetime.

Since the number of active turns in the radially outer portion of the coil spring 28 is small, the coil spring 28 can be short when fully compressed. This means that the elastic coupling portion 4 can provide a large maximum torsion angle.

As already described, since the coil spring 28 cannot rotate in the windows 21 and 22 as well as the window aperture 25, the respective portions of the coil spring 28 each having the intended number of active turns do not change their places with each other. If changed, the radially inner portion would have a number of active turns, that is smaller than that in the radially outer portion. Further, a difference in stress larger than that in the prior art would occur between the radially inner and outer portions. Thus, the spring constant would exceed the intended value.

Another advantage is that the spaces between the wire portions are maintained. As described above, the coil spring 28 cannot rotate in the windows 21 and 22 and the window aperture 25. Therefore, the position of the ends of the coil spring 28 is not inverted. In the inverted position, the first and second spaces 31 and 32 are located in the radially inner portions, and the third and fourth spaces 33 and 34 are located in the radially outer portions. In this case, the third space in the radially outer portion disappears prior to the others, and the fourth space does not disappear even at the maximum torsion angle. In other words, if the coil spring 28 is not inverted, the spring torsion characteristics or spring constant changes as planned, and the range of the second stage increases so that the stop torque increases. If the end position of the coil spring is inverted from the desired position, the number of active turns in the radially outer portion is larger than the number of active turn in the radially inner portion so that the torsional rigidity increases even in the first torsional stage.

Other Embodiments

Alternate embodiments of the present invention will now be discussed. In view of the similarites between these embodiments and previous embodiment, discussed above, the components or parts of these embodiments that have the same function of the corresponding components or parts of the previous embodiment are being given the identical reference numerals. Moreover, the explanations of components or parts and the operations of these embodiments that are similar to components or parts and the operations of the first embodiment will be omitted. Only components and operations of these embodiments that are different in structure and function from the previous embodiment will be explained herein.

(1) For further increasing the stop torque, a member for generating the stop torque may be arranged within the coil spring 28, and thus between the paired spring seats 29 and 30. The member may be a columnar float member made of resin or rubber, or a coil spring of a small diameter. The stop torque generating member is shorter than the initial distance between the paired spring seats, and can move therebetween in the rotating direction. When the torsion angle of the damper mechanism increases to a predetermined value (at the torsional rigidity changing point shown in FIG. 5 in the embodiment already described), the stop torque generating member starts to be compressed so that the characteristics of a high rigidity will be achieved thereafter.

Figure 7:
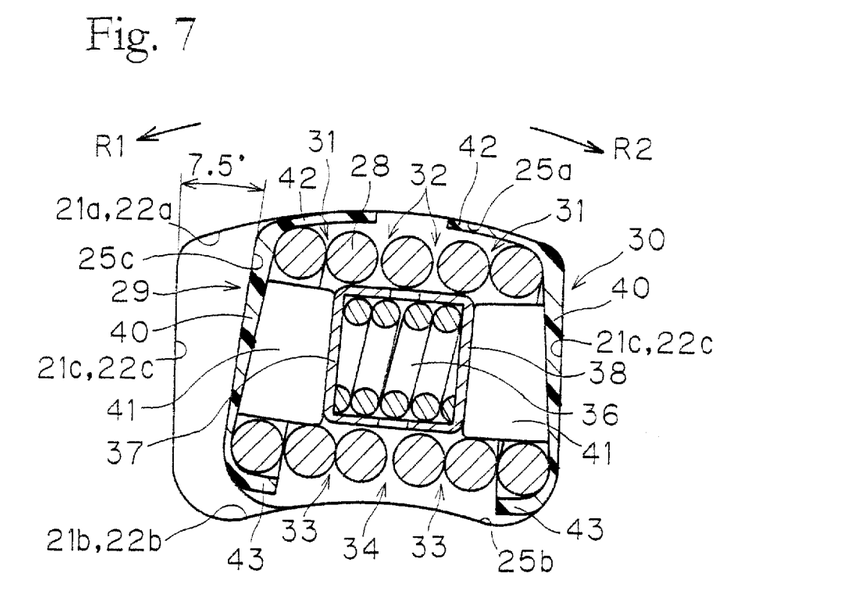
FIG. 7 is a cross-sectional elevational view showing an operation of an elastic coupling portion in accordance with an alternate embodiment of the present invention.

In an embodiment shown in FIG. 7, a second coil spring 36 is used as the stop torque generating member. The second coil spring 36 has a coil diameter and a wire diameter which are smaller than those of the coil spring 28, and is arranged within the coil spring 28. Second seat members 37 and 38 are arranged on the opposite ends of the coil spring 28, respectively. Each of the second seat members 37 and 38 has a circular plate-like support portion in contact with the end of the second coil spring 36 as well as a cylindrical portion extending from the support portion toward the other seat member. The support portion can be in contact with the end surface of the projection 41 of each of the spring seats 29 and 30. The cylindrical portion extends around the end of the coil spring 36. The second seat members 37 and 38 stabilize the position of the second coil spring 36, and suppress the contact between the second coil spring 36 and the coil spring 28.

(2) In the embodiment already described, the coil spring is configured to cause simultaneously abutment in the radially outer and inner portions. However, a structure may be employed such that parts of the radially outer portion abut with each other at a different stage from that of the radially inner portion. In this case, a single coil spring can provide three or more stages of torsion characteristics.

(3) The structure for engaging the coil spring with the rotary member while preventing relative rotation around the spring axis is not restricted to that already described. For example, concave portions may be formed in the circumferential end support portions of the windows and window aperture of the rotary members, and the seat member may be provided with a projection extending into the concave portions.

(4) In the embodiment described above, the coil spring has the closed ends. Alternatively, the coil spring may have open ends. The number of turns, the direction of turn and the cross section of the coil spring are not restricted to those in the foregoing embodiment.

(5) The structure of the clutch disk assembly is not restricted to that of the foregoing embodiments. For example, the invention may be applied to a clutch disk assembly having a hub and a hub flange formed of a single member.

(6) The coil spring assembly and the damper mechanism of the present invention can be employed not only in the clutch disk assembly but also in other power transmission devices. For example, the invention may be applied to a flywheel assembly, in which two flywheels are elastically coupled in the rotating direction, and may also be applied to a lockup device of a torque converter.

In the damper mechanism of the present invention, the coil spring does not rotate around its own axis with respect to the input and output rotary members. Thus, the radially outer and inner portions of the coil spring do not change their places with each other. Therefore, the timing of the change in the spring constant due to compression of the coil spring does not change, and the intended torsion characteristics can be obtained.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A damper mechanism comprising:
   an input rotary member:
   an output rotary member; and
   a coil spring assembly being configured to couple elastically said input and output rotary members in a rotating direction, said coil spring assembly having a coil spring having an irregular pitch and a pair of spring seats, said spring seats being operably detachable from said input rotary member and said output rotary member, each of said pair of spring seats having a contact surface extending toward its opposing spring seat, said contact surface being configured to engage an end turn of said coil spring to prevent relative rotation around an axis of said coil spring, and each of said spring seats being engaged with said input and output rotary members to prevent rotation around said axis of said coil spring.

2. The damper mechanism according to claim 1, wherein a radially outer portion of said coil spring has a first space between turns and a second space between turns larger than said first space, and a radially inner portion has a third space between turns smaller than said first space and a fourth space between turns larger than said third space.

3. The damper mechanism according to claim 2, wherein said first and third spaces simultaneously expire when said coil spring is compressed in accordance with the relative rotation between said input and output rotary members.

4. The damper mechanism according to claim 3, wherein a first number of active turns of said radially inner portion of said coil spring is larger than a second number of active turns of said radially outer portion.

5. The damper mechanism according to claim 2, wherein a first number of active turns of said radially inner portion of said coil spring is larger than a second number of active turns of said radially outer portion.

6. The damper mechanism according to claim 1, wherein a first number of active turns of said radially inner portion of said coil spring is larger than a second number of active turns of said radially outer portion.

7. The clutch disk assembly according to claim 1, wherein said coil spring assembly further comprises a stop torque generating member comprising an inner coil spring that is arranged radially inside said coil spring.

8. A clutch disk assembly comprising:
an input rotary member comprising a clutch disk, a clutch plate, and a retaining plate;
an output rotary member comprising a boss and a hub flange; and
a coil spring assembly being configured to couple elastically said input and output rotary members in a rotating direction, said coil spring assembly having a coil spring having an irregular pitch and a pair of spring seats each being engaged with an end of said coil spring to prevent relative rotation around an axis of said coil spring, said spring seats being operably detachable from said input rotary member and said output rotary member, and each of said spring seats being engaged with said input and output rotary members to prevent rotation around said axis of said coil spring.

9. The clutch disk assembly according to claim 8, wherein
said coil spring assembly further comprises a stop torque generating member comprising an inner coil spring that is arranged radially inside said coil spring.

10. A clutch disk assembly comprising:
an input rotary member comprising a clutch disk, a clutch plate, and a retaining plate;
an output rotary member comprising a boss and a hub flange; and
a coil spring assembly being configured to couple elastically said input and output rotary members in a rotating direction, said coil spring assembly having,
a coil spring having an irregular pitch, a first number of active turns of a radially inner portion of said coil spring being larger than a second number of active turns of a radially outer portion of said coil spring and
a pair of spring seats each being engaged with an end of said coil spring to prevent relative rotation around an axis of said coil spring, and each of said spring seats being engaged with said input and output rotary members to prevent rotation around said axis of said coil spring.

11. The clutch disk assembly according to claim 10, wherein
said coil spring assembly further comprises a stop torque generating member comprising an inner coil spring that is arranged radially inside said coil spring.

12. The clutch disk assembly according to claim 10, wherein
said radially outer portion of said coil spring has a first space between turns and a second space between turns larger than said first space, and said radially inner portion has a third space between turns smaller than said first space and a fourth space between turns larger than said third space.

13. The clutch disk assembly according to claim 12, wherein
said first and third spaces simultaneously expire when said coil spring is compressed in accordance with the relative rotation between said input and output rotary members.

14. A clutch disk assembly comprising:
an input rotary member comprising a clutch disk, a clutch plate, and a retaining plate, said clutch plate and said retaining plate each having an integrally formed first portion extending in an axial direction and a second portion extending in a radial direction, said second portion is integrally formed with said first portion;
an output rotary member comprising a boss and a hub flange; and
a coil spring assembly being configured to couple elastically said input and output rotary members in a rotating direction, said coil spring assembly having,
a coil spring having an irregular pitch and
a pair of spring seats each being engaged with an end of said coil spring to prevent relative rotation around an axis of said coil spring, and each of said spring seats being engaged with said input and output rotary members to prevent rotation around said axis of said coil spring, said spring seats being configured to contact said first and said second portions to prevent rotation of said spring seats around said axis of said coil spring.

15. The clutch disk assembly according to claim 14, wherein
said hub flange has a recess extending in a radial direction, said recess having abutting portions that extend in said radial direction, said hub is arranged axially between said clutch plate and said retaining plate, and
said clutch plate and said retaining plate are fixed together by at least one pin, said pin is configured to abut said abutting portions when said input rotary member and output rotary member rotate relative to each a predetermined amount.

16. The clutch disk assembly according to claim 15, wherein
said pin abuts one of said abutting portions when said input rotary member rotates 7.0 degrees in a negative rotational direction relative to said output rotary member, and
said pin abuts another of said abutting portions when said input rotary member rotates 7.5 degrees in a positive rotational direction relative to said output rotary member.

17. The clutch disk assembly according to claim 14, wherein
said coil spring assembly further comprises a stop torque generating member comprising an inner coil spring that is arranged radially inside said coil spring.

18. The clutch disk assembly according to claim 14, wherein
each of said pair of spring seats have a contact surface extending perpendicular to a circumferential direction, said contact surface being configured to engage an end turn of said coil spring.

19. The clutch disk assembly according to claim 18, wherein
said hub flange has a recess extending in a radial direction, said recess having abutting portions that extend in said radial direction, said hub is arranged axially between said clutch plate and said retaining plate, and
said clutch plate and said retaining plate are fixed together by at least one pin, said pin is configured to abut said abutting portions when said input rotary member and output rotary member rotate relative to each a predetermined amount.

20. The clutch disk assembly according to claim 19, wherein
said pin abuts one of said abutting portions when said input rotary member rotates 7.0 degrees in a negative rotational direction relative to said output rotary member, and
said pin abuts another of said abutting portions when said input rotary member rotates 7.5 degrees in a positive rotational direction relative to said output rotary member.

* * * * *